United States Patent [19]
Gier et al.

[11] Patent Number: 5,969,594
[45] Date of Patent: Oct. 19, 1999

[54] DEVICE FOR INDICATING THE LEVEL OF THE AXLE OF A VEHICLE

[75] Inventors: Lothar Gier, Bad Nauheim; Werner Wallrafen, Hofheim, both of Germany

[73] Assignee: Mannesmann VDO AG, Frankfurt, Germany

[21] Appl. No.: 09/007,248

[22] Filed: Jan. 14, 1998

[51] Int. Cl.$^6$ ........................................ B60Q 1/00
[52] U.S. Cl. ........................ 340/425.5; 340/440; 340/665; 340/686.1; 180/41; 280/DIG. 1
[58] Field of Search ................... 340/425.5, 440, 340/443, 665, 666, 673, 689, 686.1; 180/41, 290; 200/61.45 R, 61.53, 85 R; 280/DIG. 1

[56] References Cited

U.S. PATENT DOCUMENTS 3,634,635 1/1972 Ellis ..................................... 340/425.5
4,290,044 9/1981 Ishikawa et al. ..................... 340/425.5

Primary Examiner—Jeffery A. Hofsass
Assistant Examiner—Anh La
Attorney, Agent, or Firm—Martin A. Farber

[57] ABSTRACT

A device for indicating the level of the axle of a vehicle having a reference mark indicator which follows the level of the vehicle axle is arranged fixedly connected on the axle of the vehicle and changes its position as a result of the change in level. An electric signal which corresponds to the level of the axle is obtained from a resistance network which is firmly attached to the body of the vehicle. In a level indicator which operates with little wear, is economical to manufacture, and nevertheless is of high accuracy, the resistance network has, associated with it, a contact structure which, under the action of a magnet device which is movable by the change in position of the reference mark indicator, can be deflected in the manner that an electrical connection which is dependent on the level of the axle is produced.

26 Claims, 5 Drawing Sheets

DEVICE FOR INDICATING THE LEVEL OF THE AXLE OF A VEHICLE

FIELD AND BACKGROUND OF THE INVENTION

The present invention relates to a device for indicating the level of the axle of a vehicle having a reference mark indicator which follows the level of the axle of the vehicle, is arranged fixed to the axle, and changes its position as a result in the change in level of the axle, in which connection an electrical signal which corresponds to the level of the axle can be obtained from a resistance network which is immovably attached to the body of the vehicle.

Such devices indicating the level of the axle of a vehicle are generally known, particularly in order to determine the total maximum weight and the permissible axial load of the vehicle. An exact knowledge of the state of loading is desirable not only for reasons of safety in travel but also for reasons of economy.

As a function of the level of the axle of the vehicle, an electric signal is tapped off by a position sensor constructed as a potentiometer with wiper, this signal being used, for instance, to determine the loaded weight or else to adjust the shock-absorption of the vehicle.

Such wiper potentiometers are subject to wear of their mechanical parts and are difficult to seal off from outer influences.

SUMMARY OF THE INVENTION

It is an object of the invention to provide a level indicator which operates with little wear, is inexpensive to manufacture, and is nevertheless of high precision.

According to the invention, the level indicator is provided with a position sensor having a resistance network (14) a contact structure (18) which can be deflected under the action of a magnet device (5) which is moved by the change in position of the reference mark indicator (3) in such a manner that an electric connection which is dependent on the level of the axle is produced.

The advantage of this device is that it operates completely without wear. Furthermore, it has a high dependability of contact and high resolution. The contact structure can in this connection be any structure which in any way has tongue-like spring elements regardless of whether these spring elements are placed on individually or are developed, together with a plurality of spring elements as a one-piece structure.

As a further development, the reference mark indicator (3) is connected to the magnet device by a lever attachment (28).

The reference mark indicator (3) is advantageously itself developed as a rigid lever which moves a push rod (28) on the side of which facing away from the lever the magnet device (25) is fixed.

In one embodiment, the push rod (28) which bears the magnet device (5) is mounted movably within a transmitter housing (30) mounted on the car body.

The resistance network (14) and the contact structure (18) are also arranged in the transmitter housing (30).

The resistance network (14) is preferably arranged on a substrate (7) and the junctions of the resistance network (14) are connected with contact surfaces (16) which are also applied on the substrate (7). The improvement in the making of contact is obtained by the contact surfaces which are applied on the substrate, as a result of which a vibration-free, strong construction of the position sensor with only small dimensions is possible, which is advantageous, in particular, for use in motor vehicles.

In a further development conductive tracks (15) are arranged in the substrate (7), one end of each conductive track (15) forming a contact surface.

The contact structure (18) is arranged at a constant distance from the contact surfaces (16) which come into contact with the contact structure (18) under the action of the magnet device (5).

The contact structure (18) may be a contact-spring structure or may consist of separate contact springs. The contact-spring structure can, however, also be a one-piece flexible-bar structure.

According to a feature of the invention, the contact-spring structure (18) consists of soft-magnetic material.

Also, the invention provides that the contact-spring structure (18) consists of non-magnetic material which is provided with at least one magnetic layer.

In one embodiment the resistance network (14) is developed as a film resistance path and can be produced both in thin-film or in thick-film technique.

The invention also provides the feature that the conductive tracks (15) are arranged in whole or in part on the resistance path (14).

Also according to a feature of the invention the resistance path (14) has a meandering structure.

Still further according to a feature of the invention, the contact surfaces (16) directly adjoin the meandering structure.

The conductive tracks (15) are partly covered by the resistance path (14), and an end of each conductive track (15) which is uncovered by the resistance path forms the contact surface (16).

According to the invention, the conductive tracks (15) are of lower resistance than the individual resistors of the resistance network (14).

At least the contact surfaces (16) and the contact structure (18) are preferably enclosed in a tight sensor housing (35) comprising the substrate 7 and sensor cover 8, and the magnet device (5) is movable outside the sensor enclosure housing (35). Such a bending beam (or finger) type device has no open contacts with respect to its surroundings.

In one embodiment, the insulating substrate (7) which bears the resistance network serves at the same time as housing wall of the sensor enclosure 35, the resistance network being tightly closed by a housing cover (8) of the enclosure 35. Thus, with only a few structural parts, it is possible to obtain a level-determining device which is insensitive to corrosive surroundings.

A dependable manner of operation is possible if the magnet device (5) is urged against the outside of the enclosure 35 so that it is movable with light contact.

According to a feature of the invention, such urging is produced by a spring element which serves at the same time to receive the magnet device (5).

Furthermore, according to the invention, electric connections (11, 12) of the resistance network (14) and an electrical connection (13) of the contact spring structure (18) are conducted in sealed manner to the outside.

BRIEF DESCRIPTION OF THE DRAWINGS

With the above and other objects and advantages in view, the present invention will become more clearly understood in connection with the detailed description of preferred embodiments, when considered with the accompanying drawings, of which.

Identical features in all figures have been provided with the same reference numerals.

DETAILED DESCRIPTION OF THE PREFERRED EMBODIMENTS

The principle of measurement for the determination of the level of the axle of a vehicle is based on the phenomenon that the axles of the vehicle experience a deformation which is proportional to their load within the elastic region of each axle.

Ordinarily, a reference mark indicator is arranged in the center of a non-driven axle. In the case of driven axles, one marker is arranged on the right of the differential and one on the left of the differential.

Figure 1:
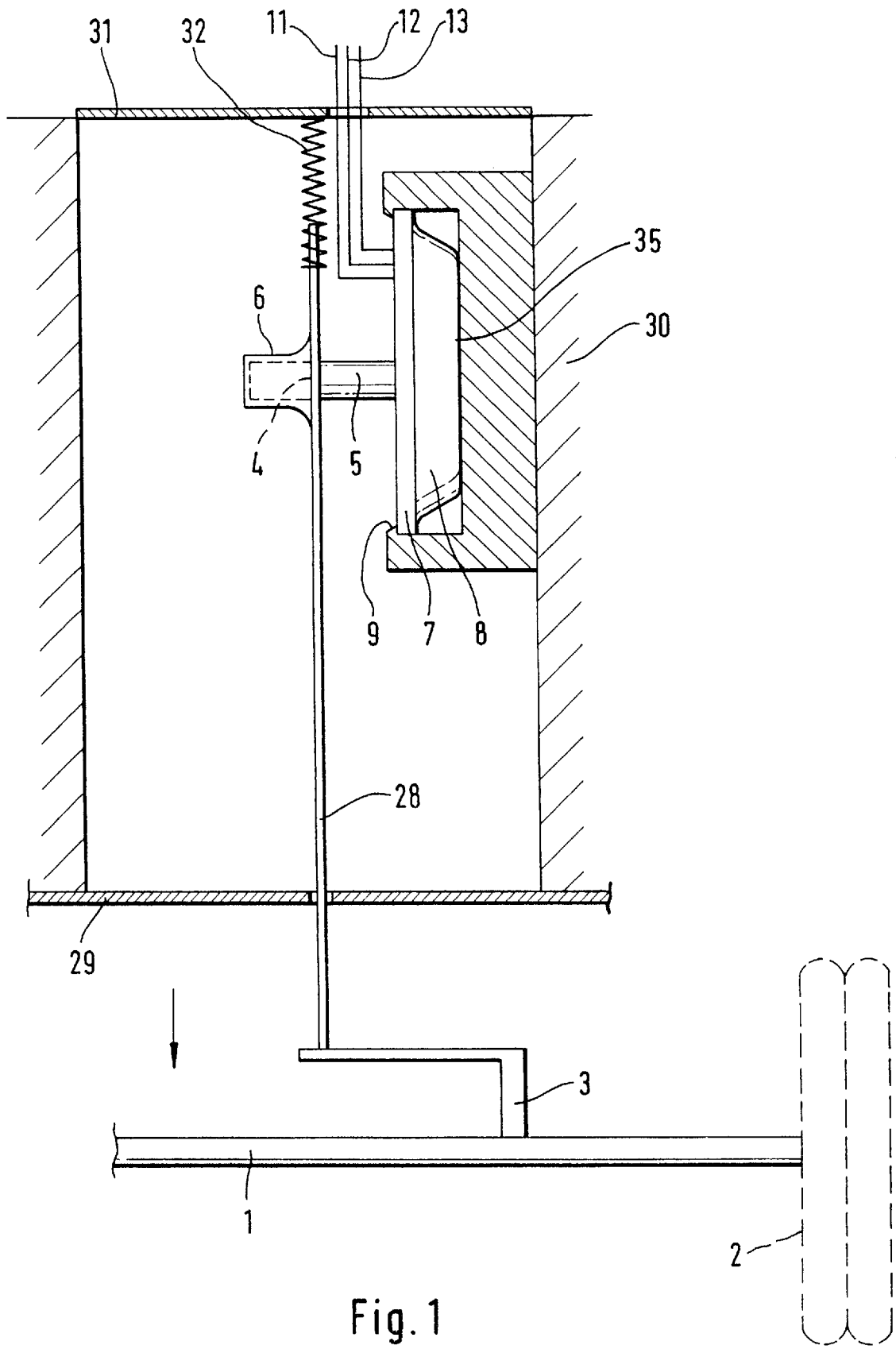
FIG. 1 is a diagrammatic showing, partly in section, of the device in accordance with the invention for determining the level of a vehicle axle.

In FIG. 1 the vehicle axle 1 with the wheel 2 mounted thereon is shown only very schematically in order to make the principle of the measurement clear. On the axle 1 there is arranged a level-like reference mark indicator 3 which is firmly attached mechanically to a push rod 28. The push rod 28 passes through a mounting plate 29, which is intended to indicate the car body, into the inside of a transmitter housing 30 of the indicator device, the housing 30 also being firmly attached to the mounting plate 29. If the vehicle is under load, the axle 1 is deformed and the reference mark indicator 3 pulls the push rod 28 in the direction indicated by the arrow. The push rod 28 bears a permanent magnet 5 on the end opposite the reference mark indicator 3 within an opening 4 in a sleeve 6, corresponding to the position of the reference mark indicator 3, the magnet 5, which is firmly anchored on the push rod 28, slides on an electrically insulating substrate 7 of a linear magnetic position sensor 35, as is fully indicated in FIG. 2.

The substrate 7 is tightly attached to a sensor cover 8 of the position sensor 35 and is connected by a clip 9 to the indicator housing 30 which is closed by a housing cover 31, only the electrical connections 11, 12, 13 of the position sensor 35 are brought out of the housing cover 31 of the indicator housing 30. The push rod 28 is urged against the reference mark indicator 3 by a spring 32, which is fastened to the inside of the housing cover 31 of the indicator housing 30.

Figure 2:
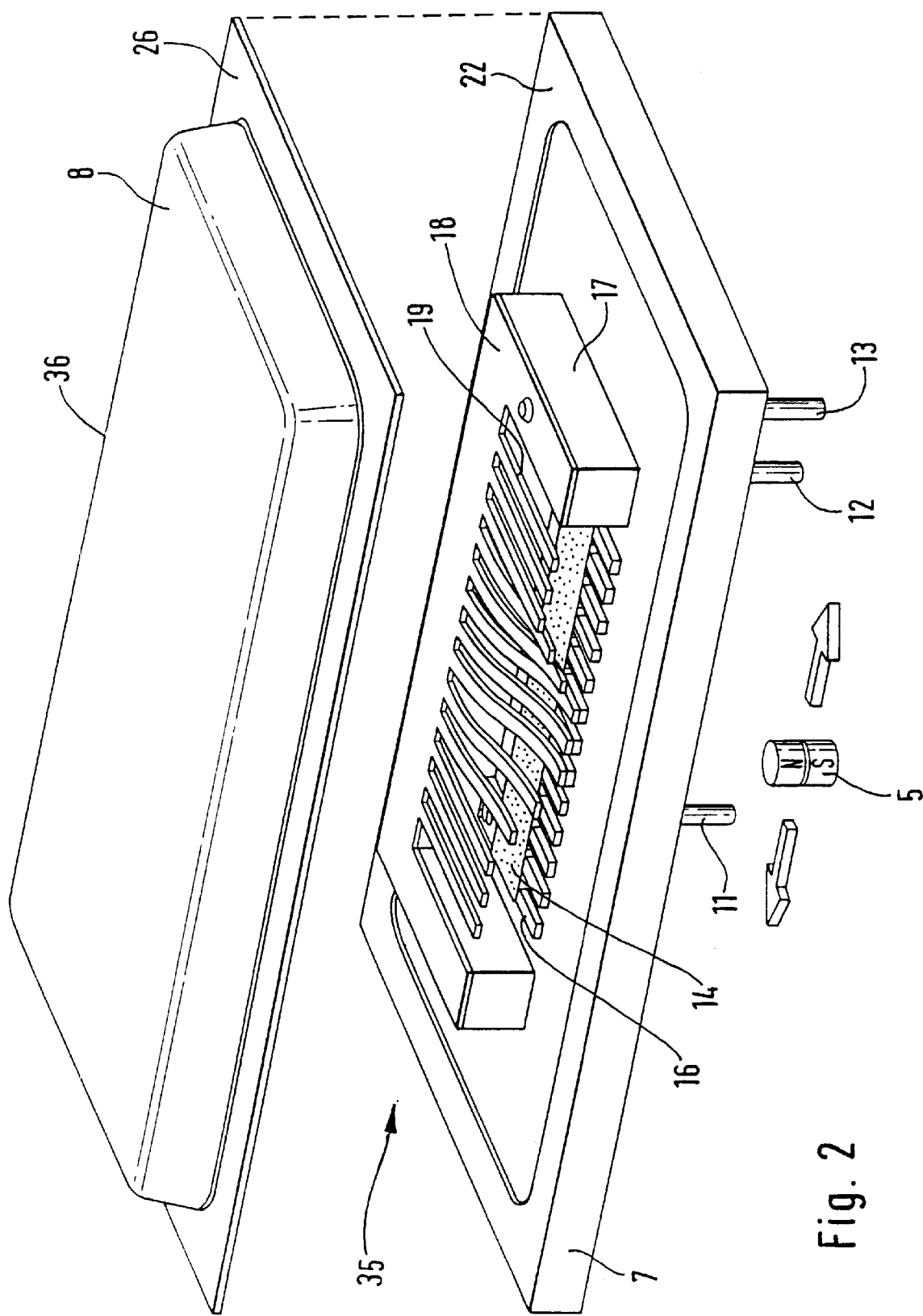
FIG. 2 is a perspective view of a linear magnetic position sensor developed as potentiometer.

In the magnetic position sensor 35, shown in FIG. 2, the substrate 7 bears a resistance path (network) 14 and the sensor cover 8.

In the sensor 30, the substrate 7 is tightly soldered, welded or bonded to the sensor cover 8 to form an enclosure 36. The substrate 7 and the sensor cover 8 consist of material of the same or similar coefficient of radial expansion.

The magnetic position sensor 35 is shown diagrammatically on the basis of a thick-film arrangement, in the form of a linear potentiometer.

The substrate 7 is non-magnetic, and bears a resistance network in the form of a film resistance path, namely, the aforementioned resistance path 14, which extends between the electric connections 11 and 12.

Figure 3:
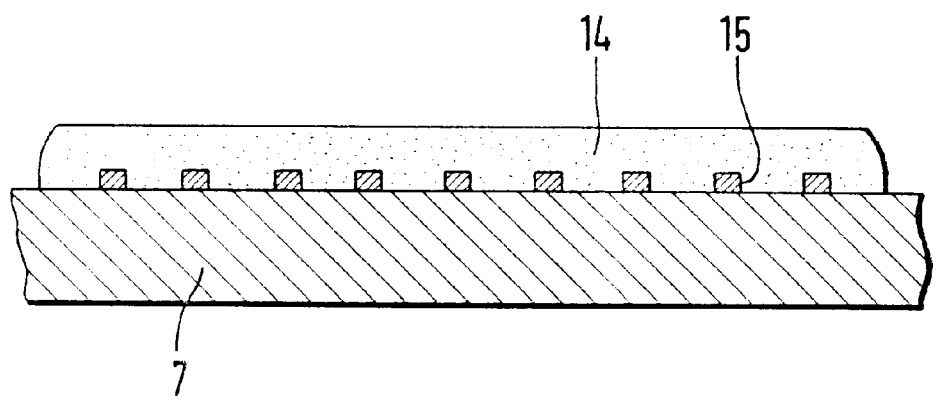
FIG. 3 is a resistance path track with conductive track shown in cross section.

Below the resistance path 14 a plurality of conductive tracks 15 are arranged on the substrate 7 (FIG. 3). The conductive tracks 15 are partly covered by the resistance path 14. In this connection, an end of each conductive track 15 which is not covered by the resistance path forms a contact surface 16 (FIG. 2), which is coated with gold or silver.

The sectional view of FIG. 3 shows that the conductive tracks 15 are completely surrounded by the resistance path 14 in the region thereof, so as to assure dependable electrical contacting. In accordance with FIG. 2, a spacer 17 is arranged on the substrate 7 in coincidence with the resistance path 14, on which spacer there is arranged a single-piece comb-shaped flexible-bar structure 18 in the form of a magnetically soft foil.

As an alternative, the flexible-bar structure 18 consists of non-magnetic material which is provided with a magnetic coating.

The comb-shaped magnetically soft flexible-bar structure 18 consists of freely movable, flexible bars 19 which are held at one end. The flexible bars 19 are coated galvanically with a layer of gold or silver in order to reduce the contact resistance.

The spacer 17 holds the freely movable ends of the flexible-bar structure 18 in a well-defined position with respect to the contact surfaces 16.

The freely movable ends of the flexible bars 19 are arranged in line with the contact surfaces 16. In this connection, the flexible-bar structure 18, which is developed as a magnetically soft foil is itself electrically conductive and is connected to the external electrical connection 13.

The resistance path 14 is connected electrically to ground and to the operating voltage $V_B$ via the connections 11 and 12. The signal voltage $V_{OUT}$ of the position indicator can be tapped via the electrical connection 13, which is connected to the flexible-bar structure 18. The signal voltage $V_{OUT}$ is variable within the region from 0 V to $V_B$ and represents the position of a permanent magnet 5.

The permanent magnet 5 which is movable, as described, outside the sensor enclosure 36 with respect to the opposite side of the substrate 7 bearing the resistance path 14, and is moved within the region in which the freely movable ends 19 of the unilaterally supported flexible-bar structure 18 lie above the contact surfaces 16. The permanent magnet 5 can in this case be so prestressed by a spring that it can move in contact along the outer side of the enclosure 36, for instance the outer side of the substrate 7.

Figure 4:
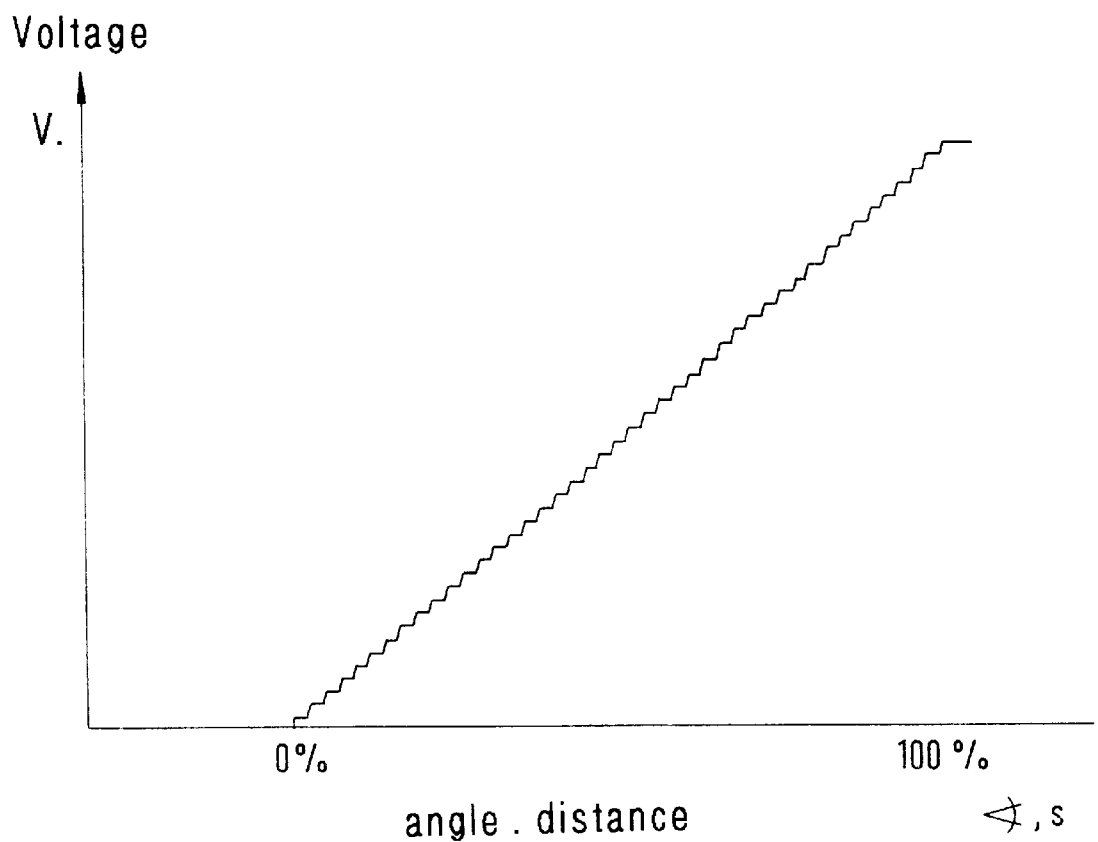
FIG. 4 is a graph of the output signal of the device of the invention.

The freely movable ends of the flexible bars of the flexible-bar structure 18 are pulled by the magnetic field of the permanent magnet 5 onto the contact surface 16 and contacted. In accordance with the position of the permanent magnet 5, an electrical connection is made with the corresponding resistors of the resistance network and a signal voltage $V_{OUT}$ corresponding to this position of the magnet 5 is tapped off. In this way a stepped output signal is produced, such as shown in FIG. 4.

The width of the permanent magnet 5 is such that several adjacent, freely movable ends 19 of the flexible-bar structure are contacted simultaneously by the corresponding contact surfaces 16 and thus act redundantly, so that interruptions in contact do not lead to a complete failure of the signal of the measurement system.

Figure 5:
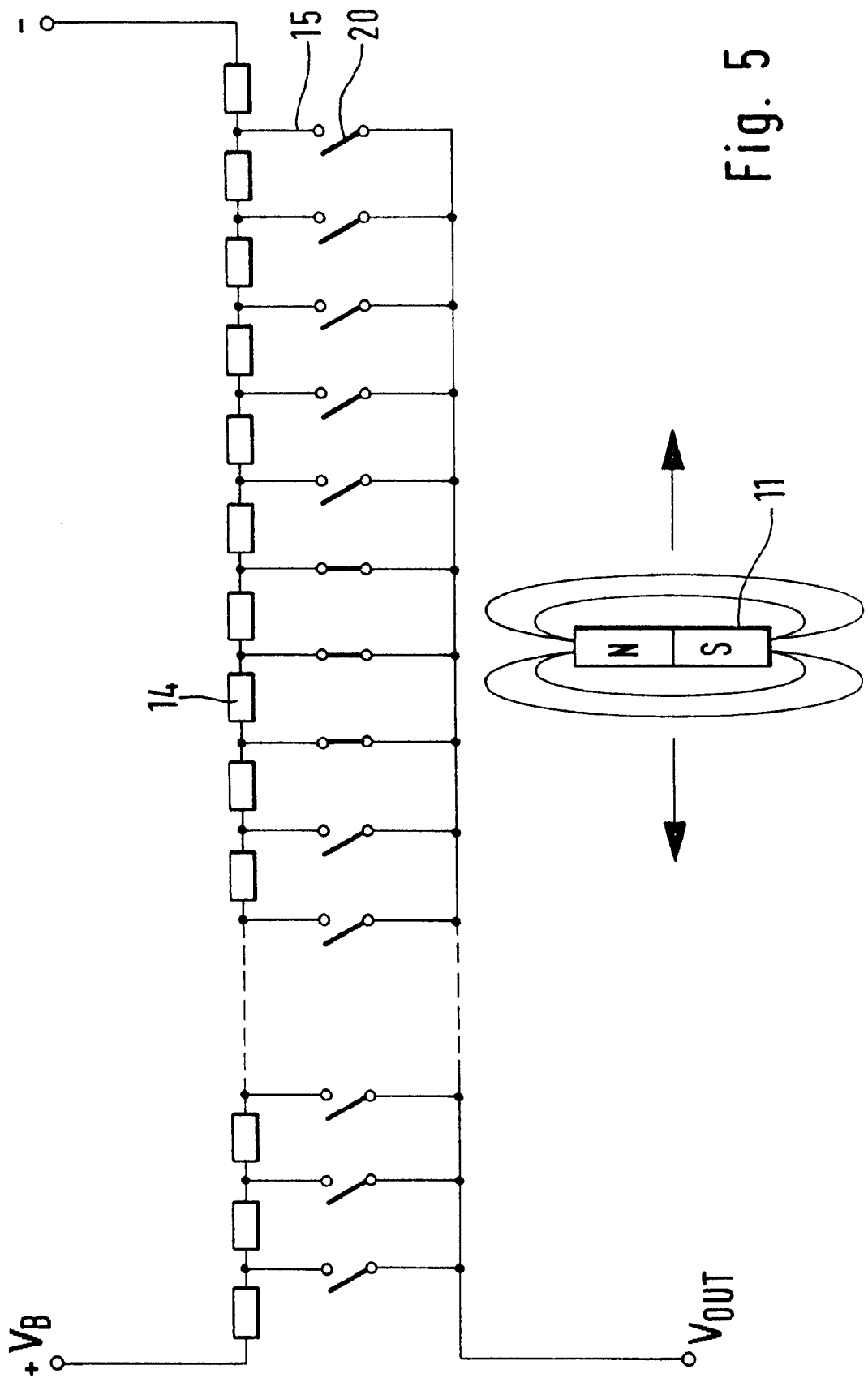
FIG. 5 is an equivalent network of the magnetic position sensor.

This is again shown in the electric equivalent circuit of the position sensor shown in FIG. 5.

The individual resistors of the resistance path (or network) 14 can, as described, be developed as path or as separate individual resistors.

The contacting of the flexible-bar elements 19 with the contact surfaces 16 on the conductive tracks 15 leads to the closing of a switch 20, as a result of which the output signal $V_{OUT}$ is produced.

The spacer 17 is fastened by means of temperature-dependent gasification-free self-adhesive foil both to the flexible bar structure 18 and to the insulating substrate 7. The spacer 17 can be made of metal in order to produce a direct electrical connection.

The spacer 17 can preferably also be made of the same material as the substrate 7.

Furthermore, a transversely bent flexible-bar structure 18 can be used to gain in spacing of the flexible bar 19 with respect to the contact surfaces 16.

The insulating substrate 7 bearing the resistance path 14 and the magnetically soft foil 18 consists of a ceramic plate. However, the use of glass or plastic supports or of glass-coated or plastic-coated metal plates is also possible, as well as the use of silicon or epoxide circuit-board material.

The insulting substrate 7 which bears the resistance path 14, the conductive tracks 15 with the contact surfaces 16, the spacers 17, as well as the flexible-bar structure 18 serves at the same time as housing wall of the position sensor 35, which is closed by a housing cover 8.

If a metallic housing cover 8 is used in the position sensor 35, then the cover can be completely tinned for protection against corrosion and to improve the solderability.

Instead of the metallic housing cover 8, a solderable metallized ceramic covering can also be used.

Another possibility consists in bonding the housing cover 8 to the substrate 7 by adhesive or a thermoplastic foil.

A metallized layer 22 as surrounding edge on the insulating substrate serves for the encapsulating of the position sensor. In order to improve the solderability, the metal layer 22 is tinned.

In order to produce the electric connections 11, 12, 13, pins are passed through the insulating substrate 7 and are soldered or welded hermetically tight there, and thus in corrosion-resistance manner, to the resistance path 14 and the flexible-bar structure 18.

As an alternative however, connecting wires 23 (FIG. 6) can also be conducted towards the outside via in each case a tight glass lead-through, each glass lead-through being conducted either through the substrate or through the housing cover 8.

Figure 6:
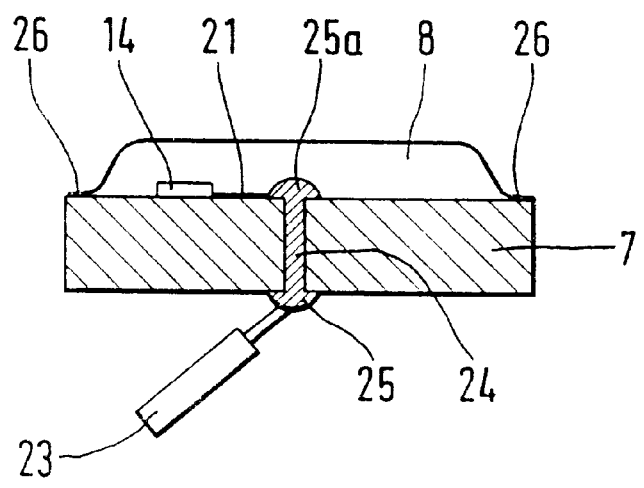
FIG. 6 shows the contacting of the electrical connections.

In a further embodiment, as shown in FIG. 6, the lead-through holes for the electric connections, for instance connection 11 in the substrate 7 (or via an alternative passage, not shown, the sensor cover 8), can be sealed off by filling the passage holes with solder 24 or connecting wires. The resultant solder point 25 serves at the same time as electrical connection for the wires 23 fed from the outside. In this way, moisture is dependably prevented from penetrating through the passage holes into the position sensor. The resistance network 14 is connected with the solder point 25a of the solder by a connecting conductive track 21 present on the substrate 7.

In the region of the surrounding edge 26 of the sensor cover 8, substrate 7 and sensor cover 8 are, as described, soldered, welded, or bonded over the metallized layer 22.

Instead of the single-piece flexible-bar structure 18 described, individual flexible bars can be used. These flexible bars also consist of a magnetically soft foil and are electrically conductive. They are also fastened by a self-adhesive foil to the spacer 17. The flexible-bar elements are so dimensioned that they move back into position by their own spring force without additional aid upon the decline in the action of the magnet. This automatic restoring applies also to the flexible-bar structure described above.

The flexible bars are connected electrically to the tap 12 for supplying the position signal $V_{OUT}$. These flexible bars may consist either of magnetically soft material or of a non-magnetic material which is provided with magnetic coatings. The flexible bars are in this case coated at least in part by a layer of noble metal.

The magnetic position sensor can, as described, be easily produced by a thick-film technique. In that case, the thickness of the layer is 5–15 $\mu$m, the width approximately 0.2 mm, and the length approximately 100 mm. The layers are applied in known thick-film technique by screen printing and then fired.

The resistance network 14 of the position sensor can be produced on the substrate, but also by thin-film technique. In that case the layer thickness is ordinarily 0.5 to 2 $\mu$m, the layer width is between 5 $\mu$m and 5 mm, and the layer length is 1 mm to 100 mm.

The conductive tracks 15 lie either between substrate 7 and resistance path 14 or the resistance path 14 is arranged directly on the substrate 7 and the conductive tracks 15 are arranged in the configuration described on the resistance path 14. This has the advantage that the entire surface of a conductive track 15 can be used as contact surface 16 in the manner described. It is also possible for resistance path 14 and contact surfaces 16 to be applied in one layout on the substrate. The resistance path 15 has in this case a meandering structure whereby a better subdivision of the resistance path 14 into individual resistors is possible. A contact surface 16 adjoins each meander in a single piece.

We claim:

1. An indicating device for indicating the level of the axle of a vehicle, the axle having a reference mark indicator which follows a level of the axle of the vehicle, the indicating device being fixedly secured to the axle for changing a sensed position as a result of a change in the level of the axle, the indicating device serving to produce an electric signal which corresponds to the level of the axle, the indicating device comprising:

a resistance network for producing the electric signal, the resistance network being immovably attached to a body of the vehicle;

a magnet device, and a contact structure located alongside of and spaced apart from the resistance network, the contact structure being deflectable under the action of the magnet device for making electrical contact with the resistance network, the magnet device being movable in response to a change in position of the reference mark indicator to produce an electrical connection with the resistance network, the connection being dependent on the level of the axle.

2. An indicating device according to claim 1, further comprising a lever attachment, wherein the reference mark indicator is connected to the magnet device by the lever attachment.

3. An indicating device according to claim 1, further comprising a push rod extending from the magnet device to the reference mark indicator, wherein the reference mark indicator is itself developed as a rigid lever which moves the push rod for displacement of the magnet device.

4. An indicating device according to claim 3, further comprising a transmitter housing mounted to the vehicle body, wherein the push rod bears the magnet device and is mounted movably within the transmitter housing.

5. An indicating device according to claim 4, wherein the resistance network and the contact structure are arranged in the transmitter housing.

6. An indicating device according to claim 5, further comprising a substrate and contact surfaces disposed on the substrate, wherein the resistance network is arranged on the substrate, and terminals of the resistance network are connected with the contact surfaces.

7. An indicating device according to claim 6, further comprising
conductive tracks arranged in the substrate, one end of each conductive track forming one of said contact surfaces.

8. An indicating device according to claim 7, wherein the contact structure is arranged at a constant distance from the contact surfaces, individual ones of the contact surfaces coming into contact with the contact structure under action of the magnet device.

9. An indicating device according to claim 8, wherein the contact structure is a contact spring structure.

10. An indicating device according to claim 9, wherein the contact structure comprises separate contact springs.

11. An indicating device according to claim 9, wherein the contact structure comprises a one-piece flexible structure.

12. An indicating device according to claim 9, wherein the contact-spring structure comprises a soft-magnetic material.

13. An indicating device according to claim 9, wherein the contact-spring structure consists of non-magnetic material which is provided with at least one magnetic layer.

14. An indicating device according to claim 1, wherein the resistance network is formed as a film resistance path.

15. An indicating device according to claim 14, wherein the resistance path has a meandering structure.

16. An indicating device according to claim 7, wherein the resistance path has a meandering structure, and the contact surfaces directly adjoin the meandering structure.

17. An indicating device according to claim 7, wherein the resistance network comprises a thin-film structure.

18. An indicating device according to claim 7, wherein the resistance network comprises a thick-film structure.

19. An indicating device according to claim 7, wherein conductive tracks are arranged in whole or in part on the resistance path.

20. An indicating device according to claim 7, wherein the conductive tracks are partly covered by the resistance path, and each conductive track has an end which is uncovered by the resistance path to form the contact surface.

21. An indicating device according to claim 7, wherein the conductive tracks are of lower resistance than the individual resistors of the resistance network.

22. An indicating device according to claim 7, further comprising an enclosure, wherein at least the contact surfaces and the contact structure are enclosed in the enclosure, and the magnet device is movable outside the enclosure.

23. An indicating device according to claim 22, further comprising a cover, said cover and said substrate serving as parts of said enclosure, said substrate being an insulating substrate,
wherein the substrate which bears the resistance network serves at the same time as a wall of said enclosure, the resistance network being tightly closed by the substrate and the housing cover.

24. An indicating device according to claim 22, wherein the magnet device is urged against the outside of the enclosure to be movable with light contact.

25. An indicating device according to claim 24, further comprising a spring element, wherein the urging of the magnet device against the enclosure is produced by the spring element which serves also to receive the magnet device.

26. An indicating device according to claim 22, further comprising electric connections of the resistance network and an electrical connection of the contact structure, wherein the electrical connections of the resistance network and the electrical connection of the contact structure pass through an outer surface of the enclosure in a sealed manner.

* * * * *